United States Patent
Karlberg et al.

(10) Patent No.: US 11,899,525 B2
(45) Date of Patent: Feb. 13, 2024

(54) REPRODUCTION OF GRAPH DATA DURING QUERY EVALUATION

(71) Applicant: Microsoft Technology Licensing, LLC, Redmond, WA (US)

(72) Inventors: Jan-Ove Almli Karlberg, Tromsø (NO); Anders Tungeland Gjerdrum, Tromsø (NO); Tor Kreutzer, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 17/678,167

(22) Filed: Feb. 23, 2022

(65) Prior Publication Data

US 2023/0267025 A1    Aug. 24, 2023

(51) Int. Cl.
| | | |
|---|---|---|
| *G06F 7/00* | (2006.01) | |
| *G06F 11/07* | (2006.01) | |
| *G06F 16/215* | (2019.01) | |
| *G06F 16/27* | (2019.01) | |
| *G06F 16/23* | (2019.01) | |
| *G06F 16/901* | (2019.01) | |

(52) U.S. Cl.
CPC ........ *G06F 11/0709* (2013.01); *G06F 16/215* (2019.01); *G06F 16/2358* (2019.01); *G06F 16/278* (2019.01); *G06F 16/9024* (2019.01)

(58) Field of Classification Search
CPC .. G06F 11/0709; G06F 16/215; G06F 16/278; G06F 16/2358; G06F 16/9024
USPC .................................. 707/714, 718, 769, 798
See application file for complete search history.

(56) References Cited

U.S. PATENT DOCUMENTS

| | | | | |
|---|---|---|---|---|
| 6,108,645 | A | * 8/2000 | Eichstaedt | .......... G06F 16/9535 |
| | | | | 707/999.001 |
| 10,296,618 | B1 | * 5/2019 | Liubovich | ............. G06F 16/252 |
| 10,489,284 | B1 | 11/2019 | Saraf | |
| 2009/0327458 | A1 | 12/2009 | Liu et al. | |

(Continued)

FOREIGN PATENT DOCUMENTS

JP    2019526851 A    9/2019

OTHER PUBLICATIONS

"International Search Report and Written Opinion issued in PCT Application No. PCT/US2022/050992", dated Mar. 28, 2023, 12 Pages.

(Continued)

*Primary Examiner* — Md I Uddin
(74) *Attorney, Agent, or Firm* — NovoTechIP International PLLC

(57) ABSTRACT

Techniques of reproduction of graph data during query time are disclosed herein. One example technique includes receiving, at a query processor, a query having a set of predicates to be evaluated on data in a graph. Upon receiving the query, the example technique includes evaluating the set of predicates based on data in the first or second partition of the graph and recording a sequence of query states of the first or second partition whose data is used to evaluate each of the set of predicates. Subsequently, the example technique includes constructing a set of snapshots of the data in the first or second partition based on the recorded query states and reevaluating the set of predicates on the constructed set of snapshots of the data in the first or second partition to troubleshoot the detected query error when the set of predicates were previously evaluated.

18 Claims, 6 Drawing Sheets

(56) References Cited

U.S. PATENT DOCUMENTS

2012/0310916 A1* 12/2012 Abadi .............. G06F 16/24542
707/E17.017
2015/0127575 A1   5/2015 Heizmann et al.
2019/0056931 A1   2/2019 Ding et al.
2021/0264058 A1   8/2021 Junkin et al.
2021/0365817 A1* 11/2021 Riegel ................... G06N 5/046

OTHER PUBLICATIONS

Bhagat, et al., "Prediction Promotes Privacy in Dynamic Social Networks", In Proceedings of the 3rd Wonference on Online Social Networks, Jun. 22, 2010, 9 Pages.
Onose, Ejiro, "How to Solve Reproducibility in ML", Retrieved From: https://neptune.ai/blog/how-to-solve-reproducibility-in-ml, Dec. 27, 2021, 23 Pages.

* cited by examiner

REPRODUCTION OF GRAPH DATA DURING QUERY EVALUATION

BACKGROUND

In computing, a graph database or "graph" generally refers to a database that uses a data structure with nodes, edges, and properties to represent and store data. For instance, a graph can include multiple data items stored as individual nodes with edges interconnecting the nodes. Each node can represent a data item (e.g., a user) and contain properties or attributes of the data item (e.g., names, aliases, emails addresses, phone numbers, etc.). Each edge can represent a relationship between two of the nodes in the graph. Example relationships can include friends, contacts, subordinates, supervisors, or other suitable types of connections.

Query processors can be configured to perform semantic queries on stored data items in a graph by traversing interconnected nodes along edges. For instance, a query processor can be configured to receive a query from a user to find all additional users who are friends of a user. In response, the query processor can be configured to locate a node in the graph corresponding to the user and then traverse any edges from the located node to find the additional users. The query processor can also be configured to execute complex queries. For instance, the query processor can be configured to query the graph to find all nodes representing users who are friends of the user and who are also friends of friends of the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing systems, data stored in a graph may be partitioned for various reasons. For example, the size of the data contained in the graph may be too large to be efficiently stored and managed as a single graph structure. In another example, laws and regulations in certain jurisdictions (e.g., the European Union), company policies, and/or service contracts may require data originated from a geological location to be stored at the same or a designated geological location (e.g., Europe), and not at other geological locations (e.g., Asia). Thus, data of a single graph originated from different geological locations may be required to be partitioned according to data origins. For example, the graph may include a European partition, an Asian partition, a North American partition, or other suitable types of partitions.

The inventors have recognized that partitioning a graph can cause certain difficulties when troubleshooting errors (referred to herein as "query errors") encountered during querying of a partitioned graph. It is believed that logic corruptions, missing or duplicated data, or other data inconsistencies may occur during query in a partitioned graph. For example, during traversal of the nodes in a first partition of the graph, the query processor can determine that a next hop is a node in a second partition of the graph. In response, the query processor continues the traversal in the second partition instead of the first partition. However, if the node in the second partition is mistakenly removed due to a processing error in the second partition, the query would fail and result in a query error.

In addition, the inventors have recognized that such data inconsistencies in the partitioned graph may be transitory to render troubleshooting previously encountered query errors difficult. For instance, in the example above, the mistakenly removed node may be restored in the second partition by a backup process after the query is performed. Thus, the query processor would not encounter the same query error again when repeating the query in the graph. In other examples, corrupt or "stale" data may be refreshed after performing a query, and duplicate nodes may be removed by an error checking or garbage collection process. As such, transitory data inconsistencies in the graph can negatively impact troubleshooting the previously encountered query errors at a later time.

Several embodiments of the disclosed technology are directed to a computer hardware/software troubleshooting facility that is configured to (1) record each query state in a partitioned graph when evaluating each predicate of a query; (2) construct a set of snapshots of the data in the graph when the predicate is evaluated based on the recorded query states; and (3) execute the same query on the constructed set of snapshots. As used herein, a "query state" refers to a current state of the data in the graph when a corresponding predicate is evaluated. In certain examples, a query state can include data and metadata of one or more nodes and corresponding edges at which a predicate is evaluated. Example data/metadata of the nodes and edges can include data representing attributes, properties, versions, data/time, or other suitable information. In other examples, a query state can include data identifying all nodes and edges in a partition of the graph in which the predicate is evaluated.

In certain embodiments, the troubleshooting facility can include a recorder, an assembler, and a tester operatively coupled to one another. In other embodiments, the troubleshooting facility can also include interface, database, or other suitable components. In certain implementations, the recorder can be configured to record a sequence of multiple query states when evaluating corresponding predicates of a query. According to the sequence, the recorder can arrange the recorded query states as a list, table, or in other suitable arrangements. In other implementations, the recorder can be configured to record the sequence of query states as differences or variations from a previously recorded query state. For example, when two successive query states are the same, the recorder can be configured to record data indicating that the current query state is the same as the previous one. In another example, the recorder can be configured to, for a successive query state, record data representing only one or more differences between the successive query state and a previous one. In further implementations, the recorder can be configured to record the multiple query states in other suitable manners.

The recorder can optionally be configured to anonymize the recorded sequence of query states due to legal, regulatory, policy, or other reasons. In certain implementations, the recorder can be configured to replace identifiers, such as names, email addresses, personal identifiers, or other personal identifiable information with random aliases. For example, a name of a user can be replaced by a random alphanumerical string. In another example, the recorder can be configured to substitute a threshold value (e.g., "5") with another random number (e.g., "1793"). In other implementations, the recorder can also be configured to obfuscate the recorded sequence of query states in other suitable manners.

The assembler of the troubleshooting facility can be configured to construct a set of snapshots of partitions of the graph based on the recorded sequence of query states. In certain embodiments, the assembler can be configured to construct a snapshot of the graph at an initial time (e.g., time zero) when evaluation of an initial predicate of the query is commenced. The assembler can then construct successive snapshots based on, for example, time stamps and/or sequence of the recorded query states. In other embodiments, the assembler can be configured to construct the successive snapshots by applying the recorded differences of successive query states to corresponding previous query states. In further embodiments, the assembler can be configured to construct the snapshots in other suitable manners.

The tester of the troubleshooting facility can be configured to perform the same query on the constructed set of snapshots of the graph. In certain embodiments, the tester can be configured to perform successive evaluation of predicates of the query on corresponding constructed snapshots in a step-wise manner. For example, the tester can be configured to evaluate the initial predicate on the first snapshot. Subsequently, the tester can update the constructed graph with the successive snapshot and then evaluate another predicate until all predicates of the query are evaluated. Thus, a developer (administrator, or other suitable entity) can trace operations of evaluating the query on the graph when the graph was at the recorded query states, not at the current data state of the graph. As such, the developer can readily troubleshoot what data inconsistencies that had caused the query error in the first place.

Several embodiments of the disclosed technology can thus allow a developer or other suitable entity to troubleshoot previously encountered query errors based on a state of the data in the graph when the query errors occurred, not a current data state of the graph. As discussed above, data inconsistencies such as logic corruption, missing or duplicated data may occur in a partitioned graph. Such occurrences of inconsistent data, however, are often transitory and non-persistent. When a developer executes the same query on the graph at a later time, the query error may not be reproduced, and thus thwarting the troubleshooting effort. By recording a sequence of query states of the graph when the query was originally evaluated, data conditions in the graph can be preserved as the constructed snapshots. Using the assembler and the tester, the developer can then execute the same query on the constructed snapshots of the graph at a later time to reproduce the query error in order to troubleshoot causes of the query error.

DETAILED DESCRIPTION

Figure 1:
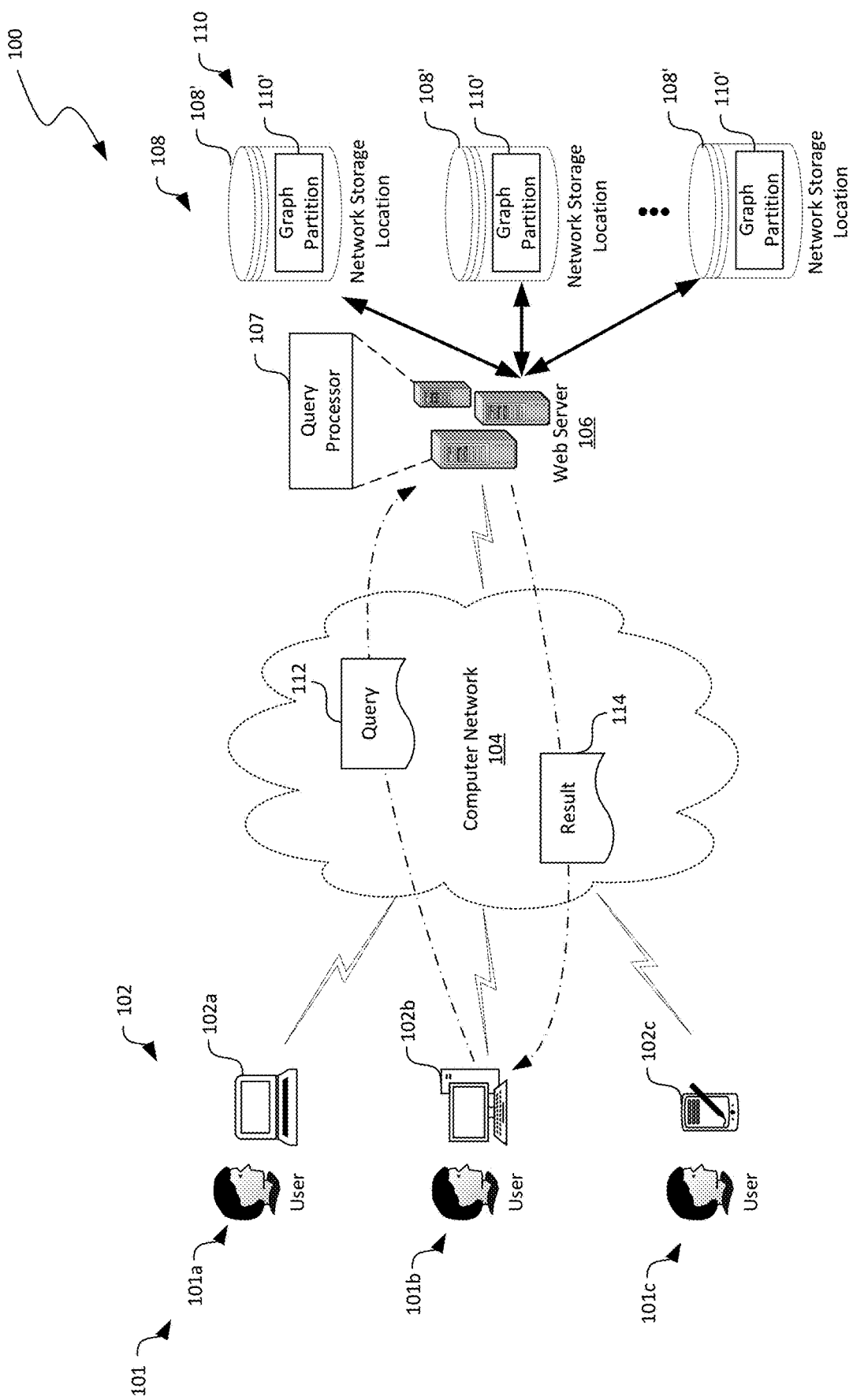
FIG. 1 is a schematic diagram illustrating a computing system implementing reproduction of graph data in accordance with embodiments of the disclosed technology.

Certain embodiments of systems, devices, components, modules, routines, data structures, and processes for reproduction of graph data in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As described herein, a distributed computing system can include an interconnected computer network having a plurality of network devices that interconnect a plurality of servers or hosts to one another or to external networks (e.g., the Internet). At least some of the servers or hosts can be in, for example, different datacenters at diverse geographic locations. A network device can include a physical or virtual network device, examples of which include physical or virtual routers, switches, hubs, bridges, load balancers, security gateways, or firewalls. A host can include a computing device configured to implement, for instance, one or more virtual machines, containers, or other suitable virtualized components. For example, a host can include a server having a hypervisor configured to support one or more virtual machines. In another example, a host can include a virtual machine hosting one or more containers or other suitable types of virtual components.

Computer system resource or computing resource can include any physical or virtual component of limited availability within a distributed computing system. Example computing resource can include processor capacities (e.g., CPU), network capacities (e.g., network connections and network bandwidth), and computer readable storage capacities (e.g., memory blocks in solid state devices). Executing an application in a computer system can consume various amount of computing assets. For example, executing an application for voice-over-IP conference can consume an amount of computing and network assets. In another example, executing an application of database management can consume an amount of processor capacities and storage capacities.

A computing service can provide computing resources to users over a computer network such as the Internet. Common examples of computing services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

FIG. 1 is a schematic diagram illustrating a distributed computing system 100 implementing reproduction of graph data in accordance with embodiments of the disclosed technology. As shown in FIG. 1, the distributed computing system 100 can include a computer network 104 interconnecting client devices 102 corresponding to users 101 and one or more web servers 106 hosting a query processor 107. The computer network 104 can include an enterprise intranet, a wide area network, the Internet, or other suitable types of networks. Though particular components are shown in FIG. 1 for illustration purposes, in other embodiments, the distributed computing system 100 can also include additional and/or different components. For example, the distributed computing system 100 can also include additional servers, network storages, load balancers, or other suitable components.

The client devices 102 can individually include a computing device that facilitates access to the query processor 107 via the computer network 104 by the users 101 (identified as first, second, and third users 101*a*-101*c*, respectively). For example, in the illustrated embodiment, the first client device 102*a* is a laptop computer. The second client device 102*b* is a desktop computer. The third client device 102*c* is a tablet computer. In other embodiments, the client devices 102 can also include smartphones, tablets, or other suitable computing devices. Even though three users 101*a*-101*c* are shown in FIG. 1 for illustration purposes, in other embodiments, the distributed computing system 100 can facilitate any suitable number of users 101 access to the network repository 108 via the computer network 104.

As shown in FIG. 1, the distributed computing system 100 can include a network storage 108 with multiple network storage locations 108'. In certain embodiments, the network storage locations 108' can be located in different geographic locations. For example, one network storage location 108' can be located in Europe while another network storage location 108' can be located in Asia or North America. In other embodiments, the network storage locations 108' can be located in different datacenters, server racks, or servers. In other embodiments, the network storage locations 108' can be logically separated from other network storage locations 108'. Though three network storage locations 108' are shown in FIG. 1 for illustration purposes, in other examples, the distributed computing system 100 can include two, four, five, or any other suitable number of network storage locations 108'.

Figure 2A:
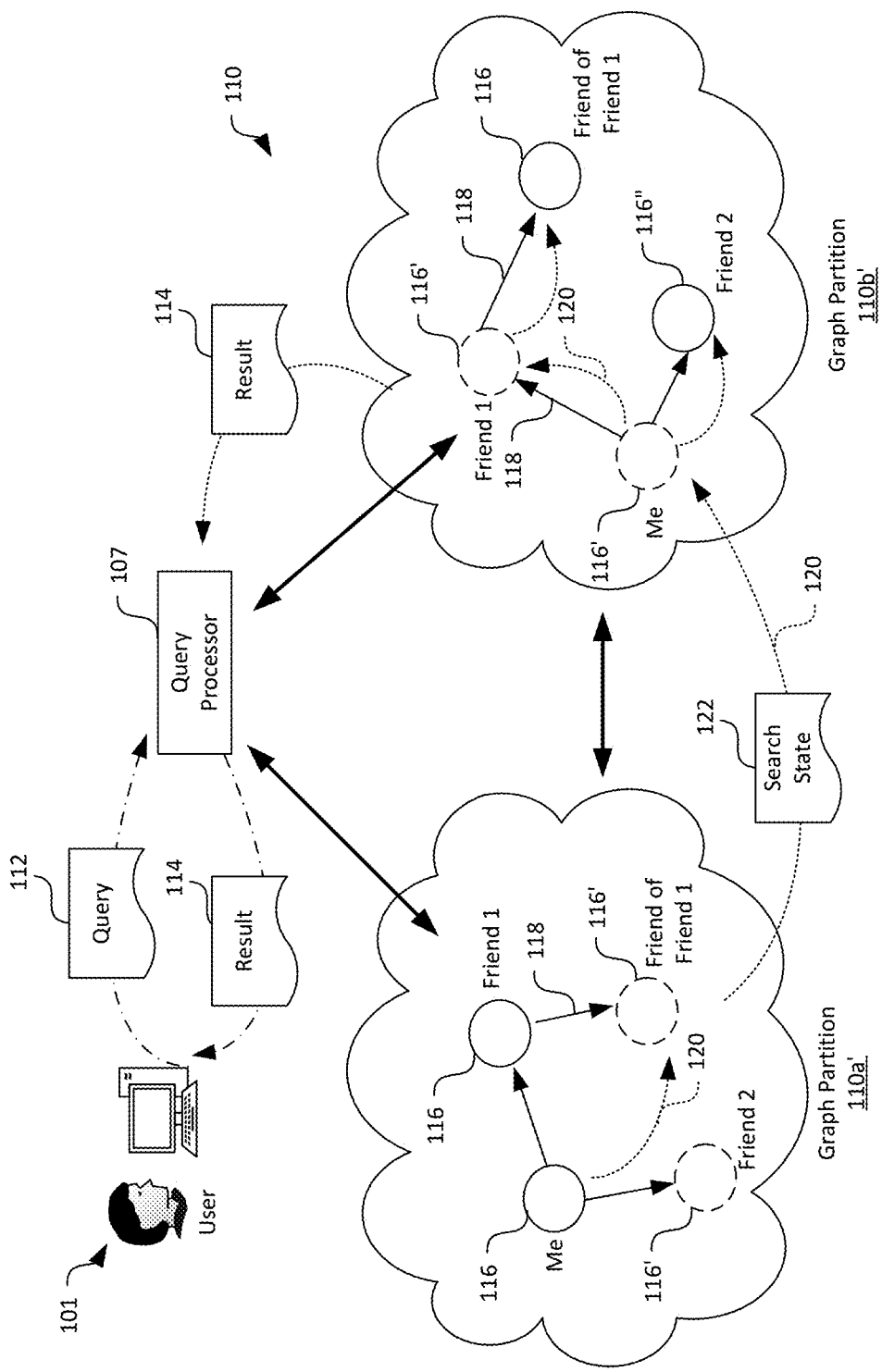
FIGS. 2A and 2B are schematic diagrams illustrating example query operations of a query processor across multiple graph partitions in the distributed computing system 100 of FIG. 1 in accordance with embodiments of the disclosed technology.
Figure 2B:
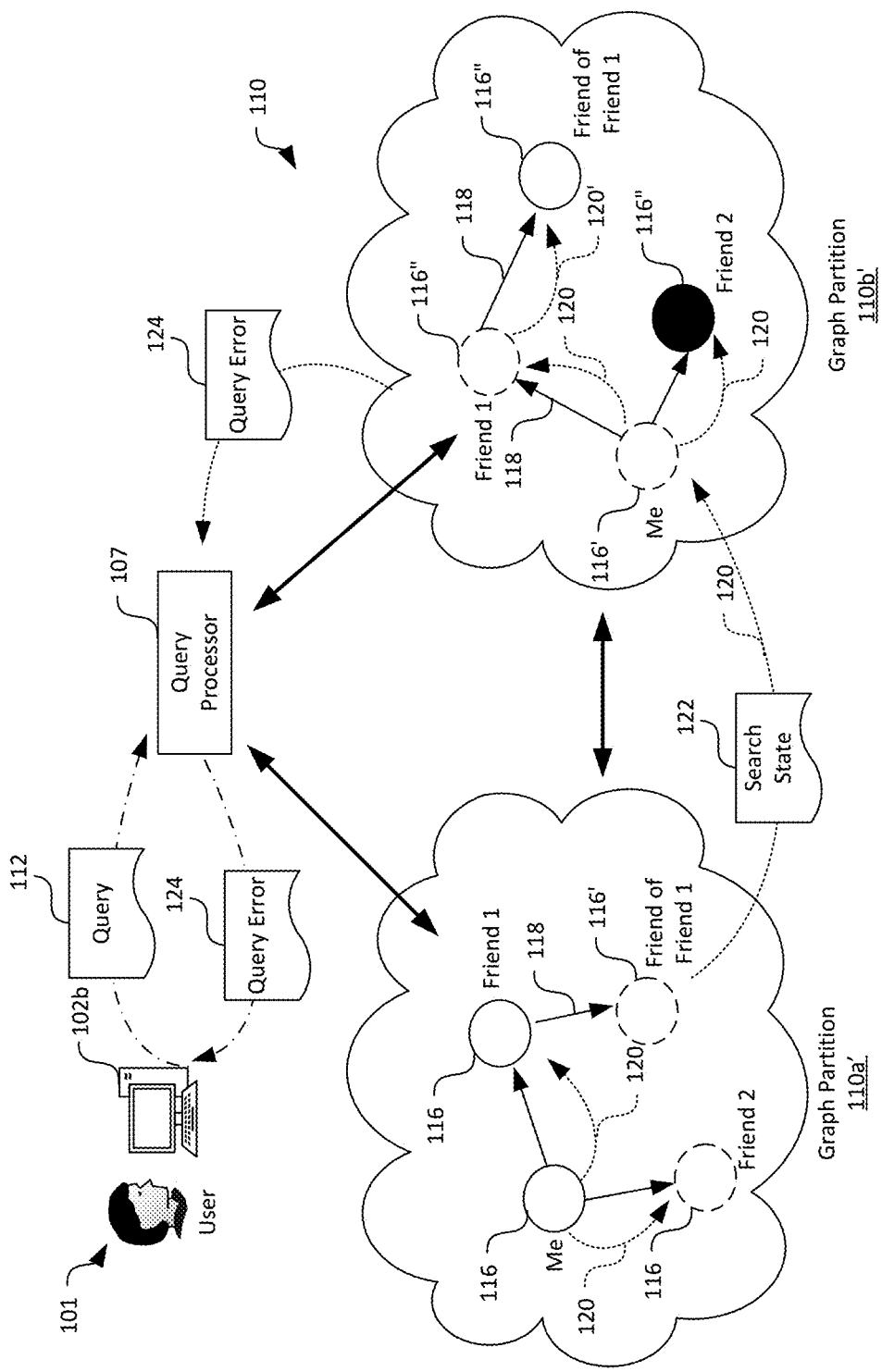

Each network storage location 108' can be configured to contain data of a graph partition 110' of a graph 110. For example, the graph 110 can contain data of users of a social network, as illustrated in FIGS. 2A and 2B below. Data of users located in Europe may be contained in a graph partition 110' stored in a network storage location 108' in Europe. Data of users located in Asia may be contained in another graph partition 110' stored in another network storage location 108' in Asian. Data of users located in North America may be contained in yet another graph partition 110' stored in a network storage location 108' in North America. Thus, compliance to various laws and regulations, company policies, and/or service contracts.

The web servers 106 can be configured to execute suitable instructions to provide the query processor 107 to query the graph 110 as well as providing other computing services to the users 101 via the computer network 104. For instance, as shown in the illustrated embodiment, the query processor 107 at the web servers 106 can be configured to receive a query 112, for instance, via a query Application Programming Interface (API), perform a query on the different graph partitions 110' of the graph 110, and return a query result 114 to the user 101. For example, during traversal of nodes in a first partition 110' of the graph 110, the query processor 107 can determine that a next hop is a node in a second partition 110' of the graph 110. In response, the query processor 107 continues the traversal in the second partition 110' instead of the first partition 110'. Detailed operations of querying across different graph partitions 110' are described in more detail below with reference to FIGS. 2A and 2B.

In other embodiments, the web servers 106 can also provide an enterprise internal website that allows the users 101 to securely exchange information and to cooperate on performing tasks or executing a project. In yet other embodiments, the web servers 106 can also be configured to provide a social network website that allows the users 101 to post messages, comment on one another's messages, share and/or recommend messages with additional users 101, or perform other suitable actions. In further embodiments, the web servers 106 can be configured to provide other suitable computing services to the users 101.

Though storing data of the graph 110 in different graph partitions 110' can facilitate compliance to laws and regulations, company policies, and/or service contracts, the inventors have recognized that transitory data inconsistencies in the partitioned graph can render troubleshooting previously encountered query errors difficult. For instance, in the example above, the mistakenly removed node may be restored in the second partition 110' by a backup process after the query is performed. Thus, the query processor 107 would not encounter the same query error again when repeating the query in the graph.

Several embodiments of the disclosed technology are directed to a computer hardware/software troubleshooting facility that is configured to (1) record each query state in a partitioned graph when evaluating each predicate of a query; (2) construct a set of snapshots of the data in the graph when the predicate is evaluated based on the recorded query states; and (3) execute the same query on the constructed set of snapshots. Thus, a developer or other suitable entities can execute the same query on the constructed snapshots of the graph at a later time to reproduce the query error in order to troubleshoot causes of the query error, as described in more detail below with reference to FIGS. 2A-3B.

FIGS. 2A and 2B are schematic diagrams illustrating example query operations of a query processor 107 across multiple graph partitions 110' in the distributed computing system 100 of FIG. 1 in accordance with embodiments of the disclosed technology. In FIGS. 2A and 2B, data of a social network is used as an example of data contained in the graph 110, and only two interconnected graph partitions 110' of the graph 110 are shown for illustration purposes. In other embodiments, the disclosed technology can be applied to graphs containing any suitable types of data with any suitable number of interconnected graph partitions 110'.

As shown in FIG. 2A, the graph 110 includes a first graph partition 110*a*' and a second graph partition 110*b*' interconnected to each other. Each of the first and second graph partitions 110*a*' and 110*b*' includes multiple nodes 116 interconnected by edges 118. For instance, the first graph partition 110*a*' includes a node 116 representing "Me" interconnected to a node 116 representing "Friend 1" and another node 116' (shown in dashed lines) representing "Friend 2." The second graph partition 110*b*' includes nodes representing "Me," "Friend 1," "Friend 1," and "Friend of Friend 1."

According to certain aspects of the disclosed technology, different nodes 116 can include different data of corresponding data items. For example, the node 116 representing "Friend 1" in the first graph partition 110*a*' can include data indicating that "Friend 1" has a name, an address, a phone number, or other suitable data stored in the first graph partition 110*a*'. Similarly, the node 116' representing "Friend 2" in the first graph partition 110*a*' can include data indicating that data of "Friend 2" is stored in a corresponding node 116 in the second graph partition 110b'. On the other hand, the nodes 116' representing "Me" and "Friend 1" in the second graph partition 110b' can include data indicating that data of "Me" and "Friend 1" is stored in corresponding nodes 116 in the first graph partition 110a' while data of "Friend 2" and "Friend of Friend 1" is stored in the second graph partition 110b'.

During searching, the query processor 107 can receive a query 112 from a user 101. The query processor 107 can then be configured to convert the received query 112 into a set of predicates for evaluation in the graph 110 according to, for instance, a graph query language such as the Cypher graph query language. For instance, in the illustrated example, the query 112 includes a request from the user 101 to find all (1) friends and (2) friends of friends of the user 101 corresponding to the node 116 representing "Me." Such a query 112 can be represented by the following codes with annotations according to the Cypher graph query language:

MATCH (me) //locate a node corresponding to "me"
  WHERE id(me)=1234 //ID of "me" is "1234"
  OPTIONAL MATCH (me)-[:FriendOf]→(friend) //find all my friends, if any
  OPTIONAL MATCH (friend)←[:FriendOf]-(me) //find all my friends of friends, if any
  RETURN me.name, friend.name //return names of "me" and located friends In response, the query processor 107 can first locate the node 116 representing "Me," and then traverse the edges 118 from the node 116 representing "Me" to locate nodes 116 immediately connected to the node 116 representing "Me," as represented by the arrows 120. In the illustrated example, the query processor 107 can thus locate the node 116 representing "Friend 1" and the node 116' representing "Friend 2."

The query processor 107 can then be configured to retrieve data from the located nodes 116 representing "Friend 1" and the node 116' representing "Friend 2." For instance, the query processor 107 can identify the name or other information of the user corresponding to the node 116 representing "Friend 1." The query processor 107 can also determine, based on the retrieved data, that data of the user corresponding to "Friend 2" is located in the second graph partition 110b'. In response, the query processor 107 can generate a search state 122 storing information of the query 112 as well as the already retrieved data from the located nodes 116 and 116' and transfer the search state 122 to the second graph partition 110b' to continue traversing the nodes 116.

As shown in FIG. 2A, based on the search state 122, the query processor 107 can then identify, in the second graph partition 110b', data of the user corresponding to "Friend 2." The query processor 107 can also continue evaluating the additional predicates to find friends of friends of the user corresponding to "Me" in the second graph partition 110b'. For example, as shown in FIG. 2A, the query processor 107 can locate the node 116 corresponding to "Friend of Friend 1" as connected to the node 116' corresponding to "Friend 1" by traversing a corresponding edge 118, as represented by the arrow 120'. When there are no more connected nodes 116 in the second graph partition 110b', the query processor 107 can the combine the search results from both the first and second graph partitions 110a' and 110b' as result 114, and transmit the result 114 to the user 101 in response to the received query 112.

The inventors have recognized that partitioning the graph 110 can cause certain difficulties when troubleshooting query errors encountered when evaluating predicates in a graph partition 110'. It is believed that logic corruptions, missing or duplicated data, or other data inconsistencies may occur during query in a partitioned graph. For example, as shown in FIG. 2B, during traversal of the nodes 116 the second graph partition 110b', the node corresponding to "Friend 2" may be mistakenly removed (shown with reverse contrast) due to a processing error in the second graph partition 110b'. As such, the query processor 107 can generate an alert for a query error 124 and transmit the generated query error 124 to the user 101 in response to the query 112. The user 101 can then send the query error 112 to a developer, an administrator, a technical support person, or other suitable entity for troubleshooting.

However, the inventors have also recognized that such data inconsistencies in the partitioned graph may be transitory to render troubleshooting previously encountered query errors 122 difficult. For instance, in the example above, the mistakenly removed node 116 corresponding to "Friend 2" may be restored in the second graph partition 110b' by a backup process after the initial query 112 is evaluated. Thus, the query processor 107 would not encounter the same query error 124 again when repeating the query 112 in the graph 110. In other examples, corrupt or "stale" data may be refreshed after performing a query, and duplicate nodes may be removed by an error checking or garbage collection process. As such, transitory data inconsistencies in the graph 110 can negatively impact the ability to troubleshoot the previously encountered query errors at a later time.

Figure 3A:
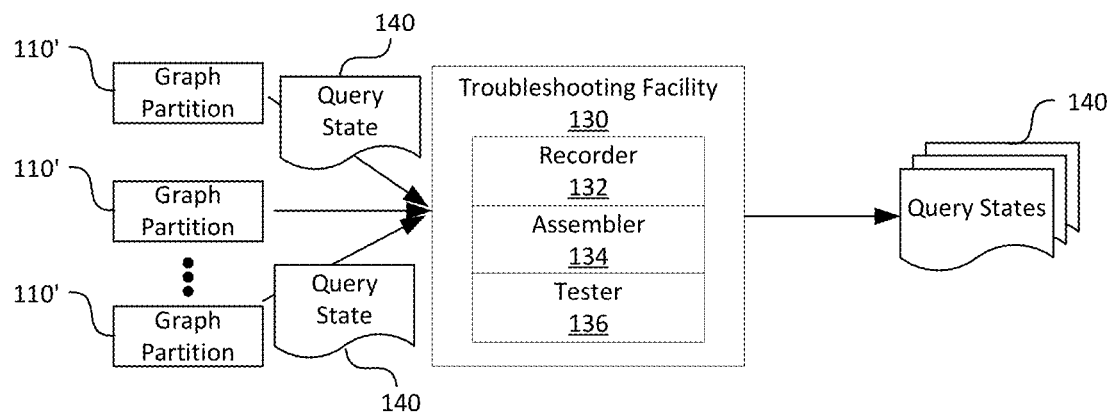
FIGS. 3A and 3B are schematic diagram of a troubleshooting facility configured to reproduce graph data in accordance with embodiments of the disclosed technology.
Figure 3B:
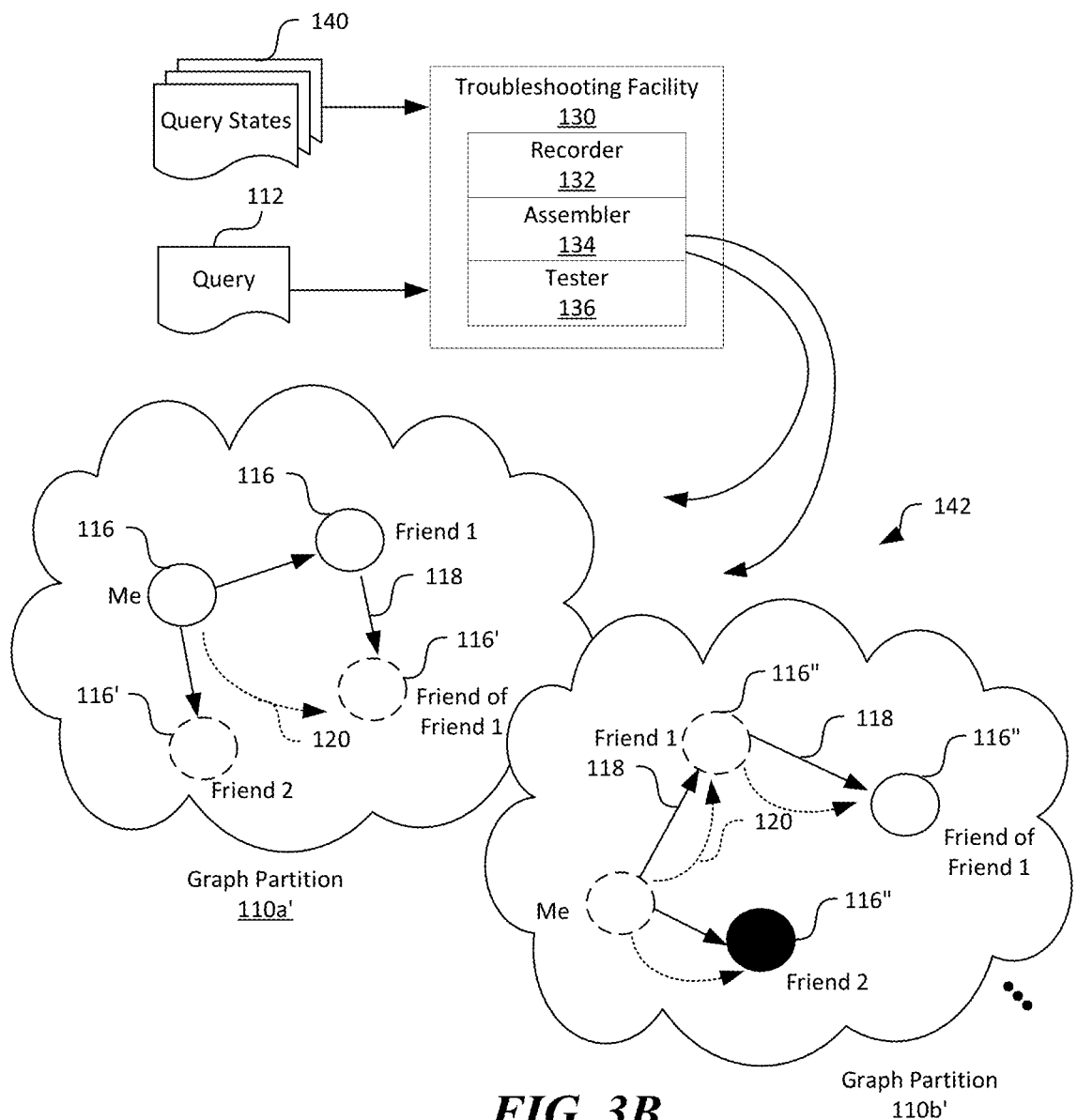

As shown in FIGS. 3A and 3B, several embodiments of the disclosed technology are directed to a computer hardware/software troubleshooting facility 130 that includes (1) a recorder 132 configured to record each query state 140 in a partitioned graph 110 when evaluating each predicate of a query 112; (2) an assembler 134 configured to construct a set of snapshots 142 of the data in the graph 110 when the predicate is evaluated based on the recorded query states 140; and (3) a tester 136 configured to execute the same query 112 on the constructed set of snapshots 142 for troubleshooting or other suitable purposes. In certain embodiments, the troubleshooting facility 130 can be a part of the query processor 107 (FIG. 1). In other embodiments, the troubleshooting facility 130 can be a standalone computing facility, a computing service, or can have other suitable configurations and components.

A query state can include structured or unstructured data representing a current state of the data in the graph 110 when a corresponding predicate is evaluated. In certain examples, a query state 140 can include data and metadata of one or more nodes 116 and corresponding edges 118 at which a predicate is evaluated. Example data/metadata of the nodes 116 and edges 118 can include data representing attributes, properties, versions, data/time, or other suitable information. In other examples, a query state 140 can include data identifying all nodes 116 and edges 118 in a graph partition 110' of the graph 110 in which the predicate is evaluated. In further examples, a query state 140 can include time stamps, sequence numbers, or other suitable information.

As shown in FIG. 3A, in certain implementations, the recorder 132 can be configured to record a sequence of multiple query states 140 before, during, or immediately after evaluating corresponding predicates of a query 112 (shown in FIG. 1). According to the sequence, the recorder 132 can arrange the recorded query states as a list, table, or in other suitable arrangements. In other implementations, the recorder 132 can be configured to record the sequence of query states 140 as differences or variations from a previously recorded query state 140. For example, when two successive query states 140 are the same, the recorder can be configured to record data indicating that the current query state 140 is the same as the previous one. In another example, the recorder 132 can be configured to, for a successive query state 140, record data representing only one or more differences between the successive query state 140 and a previous one. In further implementations, the recorder 132 can be configured to record the multiple query states 140 in other suitable manners.

The recorder 132 can optionally be configured to anonymize the recorded sequence of query states 140 due to legal, regulatory, policy, or other reasons. In certain implementations, the recorder 132 can be configured to replace identifiers, such as names, email addresses, personal identifiers, or other personal identifiable information with random aliases. For example, a name of a user can be replaced by a random alphanumerical string. In another example, the recorder 132 can be configured to substitute a threshold value (e.g., "5") with another random number (e.g., "1793"). In other implementations, the recorder 132 can also be configured to obfuscate the recorded sequence of query states 140 in other suitable manners.

As shown in FIG. 3B, the assembler 134 of the troubleshooting facility 130 can be configured to construct a set of snapshots 142 of graph partitions 110' of the graph 110 based on the recorded sequence of query states 140. In certain embodiments, the assembler 134 can be configured to construct a snapshot 142 of the graph 110 at an initial time (e.g., time zero) when evaluation of an initial predicate of the query 112 is commenced. The assembler 134 can then construct successive snapshots 142 based on, for example, time stamps and/or sequence of the recorded query states 140. For instance, the following are example codes with annotations according to the Cypher graph query language to construct the first and second graph partitions 110' for the example graph 110 shown in FIGS. 2A and 2B:

First Graph Partition 110a":
 CREATE (me {name: 'Me'}), //create a node corresponding to "Me"
 (f1 {name: 'Friend1'}), //create a node corresponding to "Friend 1"
 (f2 {name: 'REF'}), //create a node for "Friend 2" that is a reference to another graph partition
 (me)-[:FriendOf]→(f1), //"me" is connected to "Friend 1"
 (f1)-[:FriendOf]→(f2), //"Friend 1" is connected to "Friend 2"
 (me):-[FriendOf]→(f2) //"Me" is connected to "Friend 2"

Second Graph Partition 110b":
 CREATE (me {name: 'Me'}), //create a node corresponding to "Me"
 (f1 {name: 'REF'}), //create a node for "Friend 1" that is a reference to another graph partition
 (f2 {name: 'Friend2'}), //create a node corresponding to "Friend 2"
 (me)-[:FriendOf]→(f1), //create a node corresponding to "Friend 1"
 (f1)-[:FriendOf]→(f2), //"Friend 1" is connected to "Friend 2"
 (me)-[:FriendOf]→(f2) //"Me" is connected to "Friend 2"

By executing the foregoing codes, the assembler 134 can reconstruct the snapshots 142 of first and second graph partitions 110a' and 110b'. In other embodiments, the assembler 134 can be configured to construct the successive snapshots 142 by applying the recorded differences of successive query states 140 to corresponding previous query states 140. In further embodiments, the assembler 134 can be configured to construct the snapshots 140 in other suitable manners.

The tester 136 of the troubleshooting facility 130 can be configured to perform the same query 112 on the constructed set of snapshots 142 of the graph 110 shown in FIG. 3B. In certain embodiments, the tester 136 can be configured to perform successive evaluation of predicates of the query 112 on corresponding constructed snapshots 142 in a step-wise manner. For example, the tester 136 can be configured to evaluate the initial predicate on the first snapshot 142. Subsequently, the tester 136 can update the constructed graph 110 with the successive snapshot 142 and then evaluate another predicate until all predicates of the query 112 are evaluated. Thus, a developer (administrator, or other suitable entity) can trace operations of evaluating the query 112 on the graph 110 when the graph 110 was at the recorded query states 140, not at the current data state of the graph 110. For example, the tester 136 can detect that when traversing from the node 116' representing "Me" in the second graph partition 110b', the node 116" representing "Friend 2" was not present to cause a failure of evaluating the query 112. As such, the developer can readily troubleshoot what data inconsistencies that had caused the query error 124 in the first place even when the data inconsistencies are transitory.

Several embodiments of the disclosed technology can thus allow a developer or other suitable entity to troubleshoot previously encountered query errors 124 based on a state of the data in the graph when the query errors 124 occurred, not a current data state of the graph. As discussed above, data inconsistencies such as logic corruption, missing or duplicated data may occur in a partitioned graph. Such occurrences of inconsistent data, however, are often transitory and non-persistent. When a developer executes the same query on the graph at a later time, the previously encountered query error 124 may not be reproduced, and thus thwarting the troubleshooting effort. By recording a sequence of query states 140 of the graph 110 when the query 112 was originally evaluated, data conditions in the graph 110 can be preserved as the reconstructed snapshots 142. Using the assembler 134 and the tester 136, the developer can then execute the same query 112 on the constructed snapshots 142 of the graph 110 at a later time to reproduce the query error 124 in order to troubleshoot causes of the query error 124.

Figure 4A:
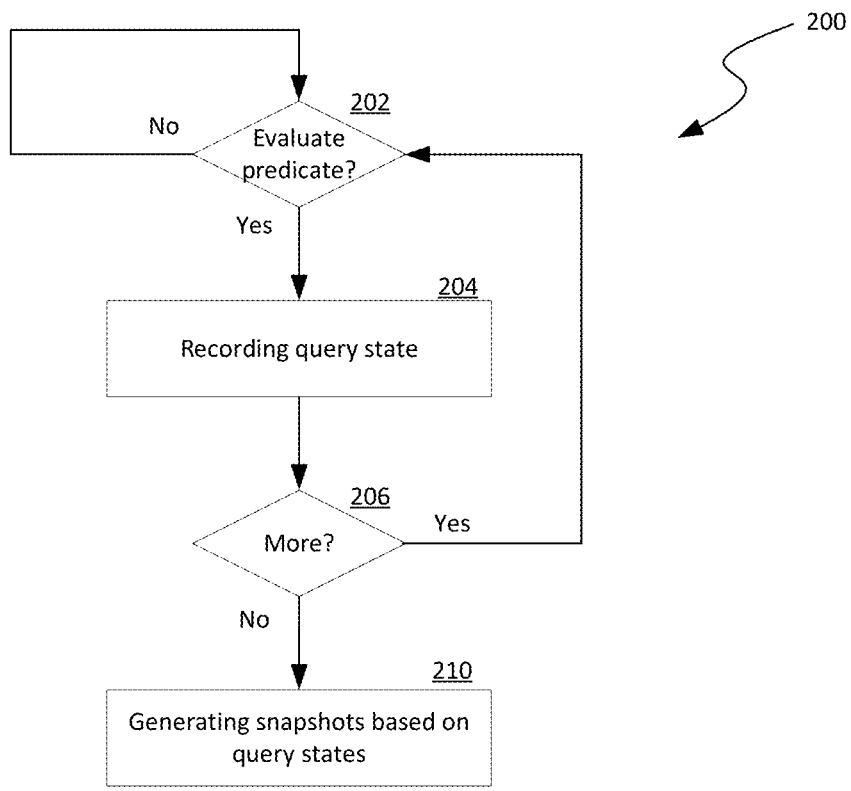
FIGS. 4A and 4B are flowcharts illustrating processes of reproduction of graph data in accordance with embodiments of the disclosed technology.
Figure 4B:
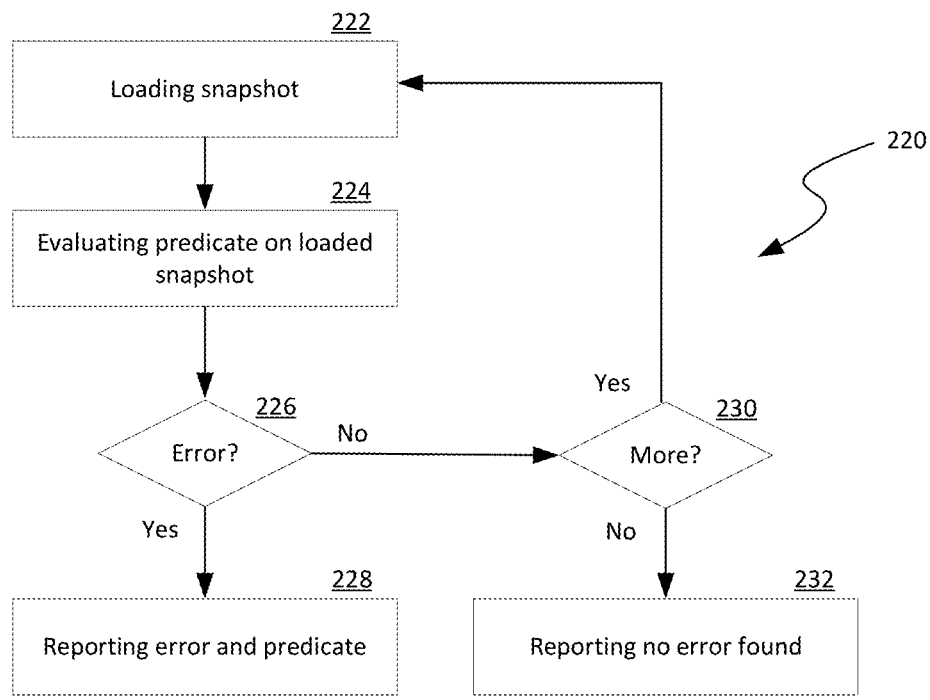

FIGS. 4A and 4B are flowcharts illustrating processes of reproduction of graph data in accordance with embodiments of the disclosed technology. Though embodiments of the processes are described below in the context of the distributed computing system 100 of FIGS. 1-3B, in other embodiments, the processes may be implemented in computing systems with additional and/or different components.

As shown in FIG. 4A, a process 200 can include a decision stage 202 to determine whether a predicate is to be or is being evaluated. In response to determining that a predicate is not to be or is being evaluated, the process 200 reverts to continuing to monitor for evaluation of predicate at stage 202. In response to determining that a predicate is to be or is being evaluated, the process 200 proceeds to recording a query state of the graph 110 (FIG. 2A). The recorded query state can then be stored in chronologically a sequence of query states corresponding to evaluating one or more predicates of a query. The process 200 can then include another decision stage 206 to determine whether an additional predicate is to be evaluated. In response to determining that another predicate is to be evaluated, the process 200 reverts to the decision stage 202. Otherwise, the process 200 proceeds to generating snapshots based on the recorded query states at stage 210. Example operations of generating the snapshots are described in more detail above with reference to FIGS. 3A and 3B.

FIG. 4B illustrates another process 220 of evaluating a query based on generated snapshots of a graph. As shown in FIG. 4B, the process 220 can include loading a snapshot at stage 222 and evaluating a predicate on the loaded snapshot at stage 224. The process 220 can then include a decision stage 226 to determine whether a query error is encountered. In response to determining that a query error is encountered, the process 220 proceeds to reporting query error and the evaluated predicate at stage 228 before proceeding to another decision stage 230. In response to determining that a query error is not encountered, the process 220 proceeds directly to the decision stage 230 to determine whether additional predicates are to be evaluated. In response to determining that no query error is found and no more predicates to be evaluated, the process 220 can proceed to reporting no error found at stage 232. Otherwise, the process 220 can revert to loading another snapshot at stage 222 before evaluating another predicate at stage 224.

Figure 5:
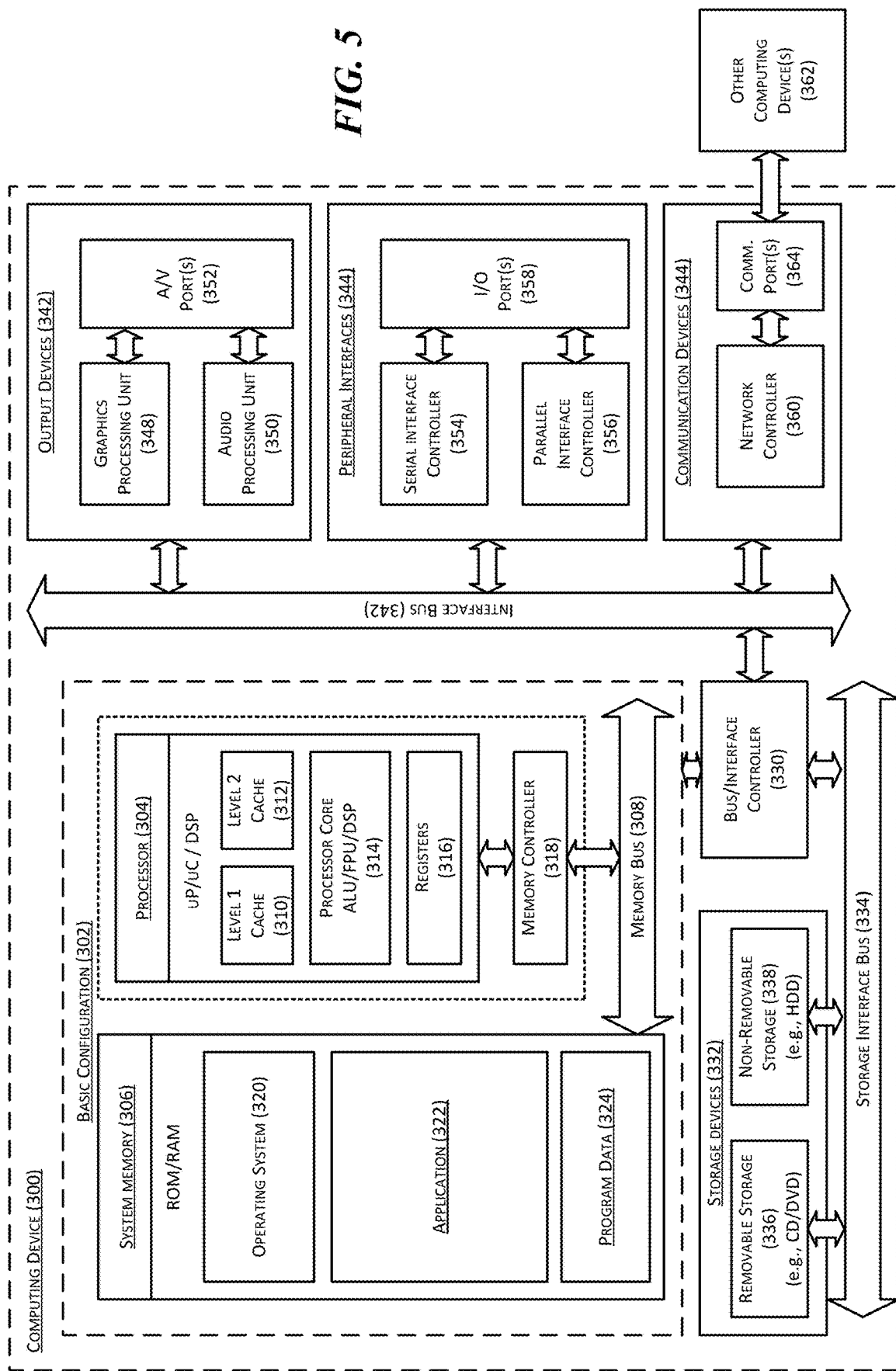
FIG. 5 is a computing device suitable for certain components of the distributed computing system in FIG. 1.

FIG. 5 is a computing device 300 suitable for certain components of the distributed computing system 100 in FIG. 1. For example, the computing device 300 can be suitable for the client devices 102 or the web servers 106 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. The operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for reproduction of graph data in a distributed computing system having multiple servers hosting a query processor configured to query a graph having a first partition interconnected to a second partition, the method comprising:
   receiving, at the query processor in the distributed computing system, a query to be evaluated on data in the graph; and
   in response to receiving the query, with the query processor,
      converting the received query into a set of predicates for evaluation;
      evaluating each of the set of predicates based on data in the first or second partition of the graph, where evaluating the set of predicates includes detecting a query error, the query error caused by at least one of logic corruption, missing data, duplicate data or other data inconsistency in the first or second partition of the graph;
      recording a sequence of query states of the first or second partition whose data is used to sequentially evaluate the each of the set of predicates by:
         detecting for evaluation one of the set of predicates on the data in the first or second partition;
         upon detecting that one of the set of predicates is to be evaluated on the data in the first or second partition, recording information of presence and relationship of data items in the first or second partition; and
      anonymizing the recorded information of the presence and relationship of the data items in the first or second partition as one of the query states; and
      subsequently, upon detecting a query error during evaluation of the set of predicates,
         constructing a set of snapshots of the data in the first or second partition of the graph based on the recorded sequence of query states; and
         reevaluating the set of predicates on the constructed set of snapshots of the data in the first or second partition to troubleshoot the detected query error when the set of predicates were previously evaluated.

2. The method of claim 1, wherein:
   the first partition is located in a first geographical location;
   the second partition is located in a second geographical location; and
   evaluating the each of the set of predicates includes evaluating the each of the set of predicates on the data in the first or second partition in the first or second geographical location, respectively.

3. The method of claim 1, wherein:
   the first partition is located in a first geographical location and contains first data;
   the second partition is located in a second geographical location and contains second data different than the first data in the first partition; and
   evaluating the each of the set of predicates includes evaluating the each of the set of predicates on the first or second data of the first or second partition in the first or second geographical location, respectively.

4. The method of claim 1, wherein recording the sequence of query states of the first or second partition includes:
   detecting evaluation of one of the set of predicates on the data in the first or second partition; and
   upon detecting that one of the set of predicates is to be evaluated on the data in the first or second partition, recording information of presence and relationship of data items in the first or second partition as one of the query states.

5. The method of claim 1, wherein recording the sequence of query states of the first or second partition further includes:
   upon detecting that one of the set of predicates is to be evaluated on the data in the first or second partition, recording information of presence and relationship of data items in the first or second partition as one of the query states; and
   storing the one of the query states according to a chronological order of evaluating the set of predicates.

6. The method of claim 1, wherein:
   evaluating the each of the set of predicates based on the data in the first or second partition of the graph includes detecting that a data item is missing from the first or second partition when evaluating one of the set of predicates; and
   recording the sequence of query states of the first or second partition includes recording information of presence and relationship of multiple data items in the first or second partition as one of the query states, the recorded information reflecting that the data item is missing from the first or second partition when the one of the predicates is evaluated.

7. The method of claim 1, wherein:
   evaluating the each of the set of predicates based on the data in the first or second partition of the graph includes detecting that a data item is missing from the first or second partition when evaluating one of the set of predicates;
   recording the sequence of query states of the first or second partition includes recording information of presence and relationship of multiple data items in the first or second partition as one of the query states, the recorded information reflecting that the data item is missing from the first or second partition when the one of the predicates is evaluated; and
   constructing the set of snapshots includes constructing one of the snapshots to reflect that the data item is missing from the first or second partition even though a copy of the data item is reintroduced to the first or second partition subsequent to the query error being detected.

8. The method of claim 1, wherein:
   evaluating the each of the set of predicates based on the data in the first or second partition of the graph includes detecting that a data item is missing from the first or second partition when evaluating one of the set of predicates;
   recording the sequence of query states of the first or second partition includes recording information of presence and relationship of multiple data items in the first or second partition as one of the query states, the recorded information reflecting that the data item is missing from the first or second partition when the one of the predicates is evaluated; and
   reevaluating the set of predicates on the constructed set of snapshots of the data in the first or second partition includes identifying that the data item missing from the first or second partition caused the detected query error even though a copy of the data item is reintroduced to the first or second partition subsequent to the query error being detected.

9. A computing device, comprising:
a processor; and
a memory containing instructions executable by the processor to cause the computing device to provide a query processor and to:
receive, at the query processor, a query to be evaluated on data in a graph; and
upon receiving the query, with the query processor,
convert the received query into a set of predicates for evaluation;
evaluate each of the set of predicates based on data in a first or second partition of the graph while recording a sequence of query states of the first or second partition whose data is used to sequentially evaluate the each of the set of predicates, where evaluating the set of predicates includes detecting a query error, the query error caused by at least one of logic corruption, missing data, duplicate data or other data inconsistency in the first or second partition of the graph and recording the sequence of query states of the first or second partition whose data is used to sequentially evaluate the each of the set of predicate includes:
detecting for evaluation one of the set of predicates on the data in the first or second partition;
upon detecting that one of the set of predicates is to be evaluated on the data in the first or second partition, recording information of presence and relationship of data items in the first or second partition; and
anonymizing the recorded information of the presence and relationship of the data items in the first or second partition as one of the query states; and
subsequently, upon detecting a query error during evaluation of the set of predicates,
construct a set of snapshots of the data in the first or second partition of the graph based on the recorded sequence of query states; and
reevaluate the set of predicates on the constructed set of snapshots of the data in the first or second partition to troubleshoot the detected query error when the set of predicates were previously evaluated.

10. The computing device of claim 9, wherein:
the first partition is located in a first geographical location and contains first data;
the second partition is located in a second geographical location and contains second data different than the first data in the first partition; and
to evaluate the each of the set of predicates includes to evaluate the each of the set of predicates on the first or second data of the first or second partition in the first or second geographical location, respectively.

11. The computing device of claim 9, wherein to record the sequence of query states of the first or second partition further includes to:
upon detecting that one of the set of predicates is to be evaluated on the data in the first or second partition, record information of presence and relationship of data items in the first or second partition as one of the query states; and
anonymize the recorded information of the presence and relationship of the data items in the first or second partition as one of the query states.

12. The computing device of claim 9, wherein:
to evaluate the each of the set of predicates based on the data in the first or second partition of the graph includes to detect that a data item is missing from the first or second partition when evaluating one of the set of predicates; and
to record the sequence of query states of the first or second partition includes to record information of presence and relationship of multiple data items in the first or second partition as one of the query states, the recorded information reflecting that the data item is missing from the first or second partition when the one of the predicates is evaluated.

13. The computing device of claim 9, wherein:
to evaluate the each of the set of predicates based on the data in the first or second partition of the graph includes to detect that a data item is missing from the first or second partition when evaluating one of the set of predicates;
to record the sequence of query states of the first or second partition includes to record information of presence and relationship of multiple data items in the first or second partition as one of the query states, the recorded information reflecting that the data item is missing from the first or second partition when the one of the predicates is evaluated; and
to construct the set of snapshots includes to construct one of the snapshots to reflect that the data item is missing from the first or second partition even though a copy of the data item is reintroduced to the first or second partition subsequent to the query error being detected.

14. The computing device of claim 9, wherein:
to evaluate the each of the set of predicates based on the data in the first or second partition of the graph includes to detect that a data item is missing from the first or second partition when evaluating one of the set of predicates;
to record the sequence of query states of the first or second partition includes to record information of presence and relationship of multiple data items in the first or second partition as one of the query states, the recorded information reflecting that the data item is missing from the first or second partition when the one of the predicates is evaluated; and
to reevaluate the set of predicates on the constructed set of snapshots of the data in the first or second partition includes to identify that the data item missing from the first or second partition caused the detected query error even though a copy of the data item is reintroduced to the first or second partition subsequent to the query error being detected.

15. A method for reproduction of graph data in a distributed computing system having multiple servers hosting a query processor configured to query a graph having a first partition interconnected to a second partition, the method comprising:
receiving, at the query processor in the distributed computing system, a query to be evaluated on data in the graph, the query includes a set of predicates for evaluation;
upon receiving the query, with the query processor,
evaluating the set of predicates based on data in the first or second partition of the graph, where evaluating the set of predicates includes detecting a query error, the query error caused by at least one of logic corruption, missing data, duplicate data or other data inconsistency in the first or second partition of the graph;

recording a sequence of query states of the first or second partition whose data is used to evaluate each of the set of predicates by:

detecting for evaluation one of the set of predicates on the data in the first or second partition;

upon detecting that one of the set of predicates is to be evaluated on the data in the first or second partition, recording information of presence and relationship of data items in the first or second partition; and anonymizing the recorded information of the presence and relationship of the data items in the first or second partition as one of the query states; and subsequent to evaluating the set of predicates and recording the sequence of query states, constructing a set of snapshots of the data in the first or second partition of the graph based on the recorded sequence of query states; and reevaluating the set of predicates on the constructed set of snapshots of the data in the first or second partition to troubleshoot the detected query error when the set of predicates were previously evaluated.

16. The method of claim 15, wherein:

evaluating the each of the set of predicates based on the data in the first or second partition of the graph includes detecting that a data item is missing from the first or second partition when evaluating one of the set of predicates; and recording the sequence of query states of the first or second partition includes recording information of presence and relationship of multiple data items in the first or second partition as one of the query states, the recorded information reflecting that the data item is missing from the first or second partition when the one of the predicates is evaluated.

17. The method of claim 15, wherein:

evaluating the each of the set of predicates based on the data in the first or second partition of the graph includes detecting that a data item is missing from the first or second partition when evaluating one of the set of predicates;

recording the sequence of query states of the first or second partition includes recording information of presence and relationship of multiple data items in the first or second partition as one of the query states, the recorded information reflecting that the data item is missing from the first or second partition when the one of the predicates is evaluated; and constructing the set of snapshots includes constructing one of the snapshots to reflect that the data item is missing from the first or second partition even though a copy of the data item is reintroduced to the first or second partition subsequent to the query error being detected.

18. The method of claim 15, wherein:

evaluating the each of the set of predicates based on the data in the first or second partition of the graph includes detecting that a data item is missing from the first or second partition when evaluating one of the set of predicates;

recording the sequence of query states of the first or second partition includes recording information of presence and relationship of multiple data items in the first or second partition as one of the query states, the recorded information reflecting that the data item is missing from the first or second partition when the one of the predicates is evaluated; and reevaluating the set of predicates on the constructed set of snapshots of the data in the first or second partition includes identifying that the data item missing from the first or second partition caused the detected query error even though a copy of the data item is reintroduced to the first or second partition subsequent to the query error being detected.

\* \* \* \* \*